(12) United States Patent
Ahn et al.

(10) Patent No.: US 8,130,630 B2
(45) Date of Patent: Mar. 6, 2012

(54) APPARATUS FOR GENERATING DOWN LINK SIGNAL, AND METHOD AND APPARATUS FOR CELL SEARCH IN CELLULAR SYSTEM

(75) Inventors: Jae-Young Ahn, Daejeon (KR); Bang-Won Seo, Daejeon (KR); Sang-Hyun Lee, Daejeon (KR); Young-Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 850 days.

(21) Appl. No.: 12/065,831

(22) PCT Filed: Sep. 5, 2006

(86) PCT No.: PCT/KR2006/003518
§ 371 (c)(1),
(2), (4) Date: Mar. 5, 2008

(87) PCT Pub. No.: WO2007/029958
PCT Pub. Date: Mar. 15, 2007

(65) Prior Publication Data
US 2008/0212462 A1  Sep. 4, 2008

(30) Foreign Application Priority Data

Sep. 5, 2005 (KR) .......................... 10-2005-0082230
May 12, 2006 (KR) .......................... 10-2006-0042838

(51) Int. Cl.
*H04J 11/00* (2006.01)

(52) U.S. Cl. ........ 370/208; 370/203; 370/209; 370/260; 370/343; 370/350; 370/430; 370/479; 370/480; 375/260

(58) Field of Classification Search ........................ None
See application file for complete search history.

(56) References Cited

U.S. PATENT DOCUMENTS

| 7,313,398 | B1 * | 12/2007 | Ramahi ........................ 455/436 |
| 2002/0003774 | A1 * | 1/2002 | Wang et al. ................... 370/208 |
| 2002/0181391 | A1 | 12/2002 | Wang |
| 2005/0157637 | A1 * | 7/2005 | Feng et al. .................... 370/203 |
| 2006/0126491 | A1 | 6/2006 | Ro et al. |

FOREIGN PATENT DOCUMENTS

KR   1020050002225   1/2005
(Continued)

OTHER PUBLICATIONS

Sanat Kamal Bahl, 2003, IEEE Potentials, pp. 16-19.*
(Continued)

*Primary Examiner* — Ayaz Sheikh
*Assistant Examiner* — Nicholas Sloms
(74) *Attorney, Agent, or Firm* — Kile Park Goekjian Reed & McManus PLLC

(57) ABSTRACT

A method for generating a downlink signal and searching for a cell from the downlink signal in an OFDM-based cellular system is provided. Thus, a pilot pattern is formed in the downlink signal, and the pilot pattern is formed of a product of a cell-specific scrambling code and a cell group-specific code. The scrambling code is different for each cell and the same for each sub-frame, and the cell group-specific code is different for each cell and different for each sub-frame.

31 Claims, 14 Drawing Sheets

FOREIGN PATENT DOCUMENTS

| | | |
|---|---|---|
| KR | 1020050039263 | 4/2005 |
| WO | 03/034642 | 4/2003 |
| WO | 2004/049618 | 6/2004 |

OTHER PUBLICATIONS

International Search Report for PCT/KR2006/003518 dated Dec. 13, 2006.

Written Opinion for PCT/KR2006/003518 dated Dec. 13, 2006.

Yin-Pin Eric Wang, "Cell Search in W-CDMA", IEEE Journal on Selected Areas in Communications, vol. 18, No. 8, Aug. 2000, pp. 1470-1482.

Motohiro Tanno et al., "Three-Step Fast Cell Search Algorithm Utilizing Common Pilot Channel for OFCDM Broadband Packet Wireless Access", IEEE 2002, pp. 1575-1579.

* cited by examiner

[FIG. 1]
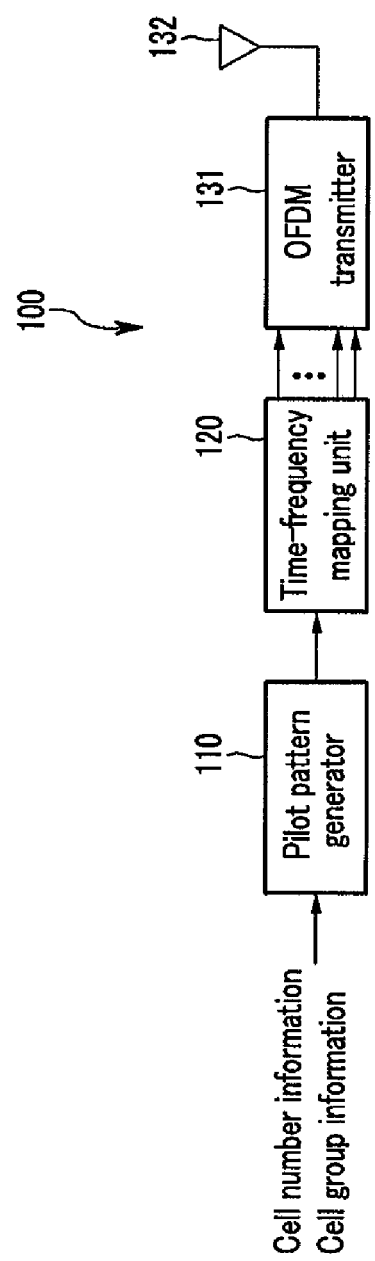

[FIG. 2]
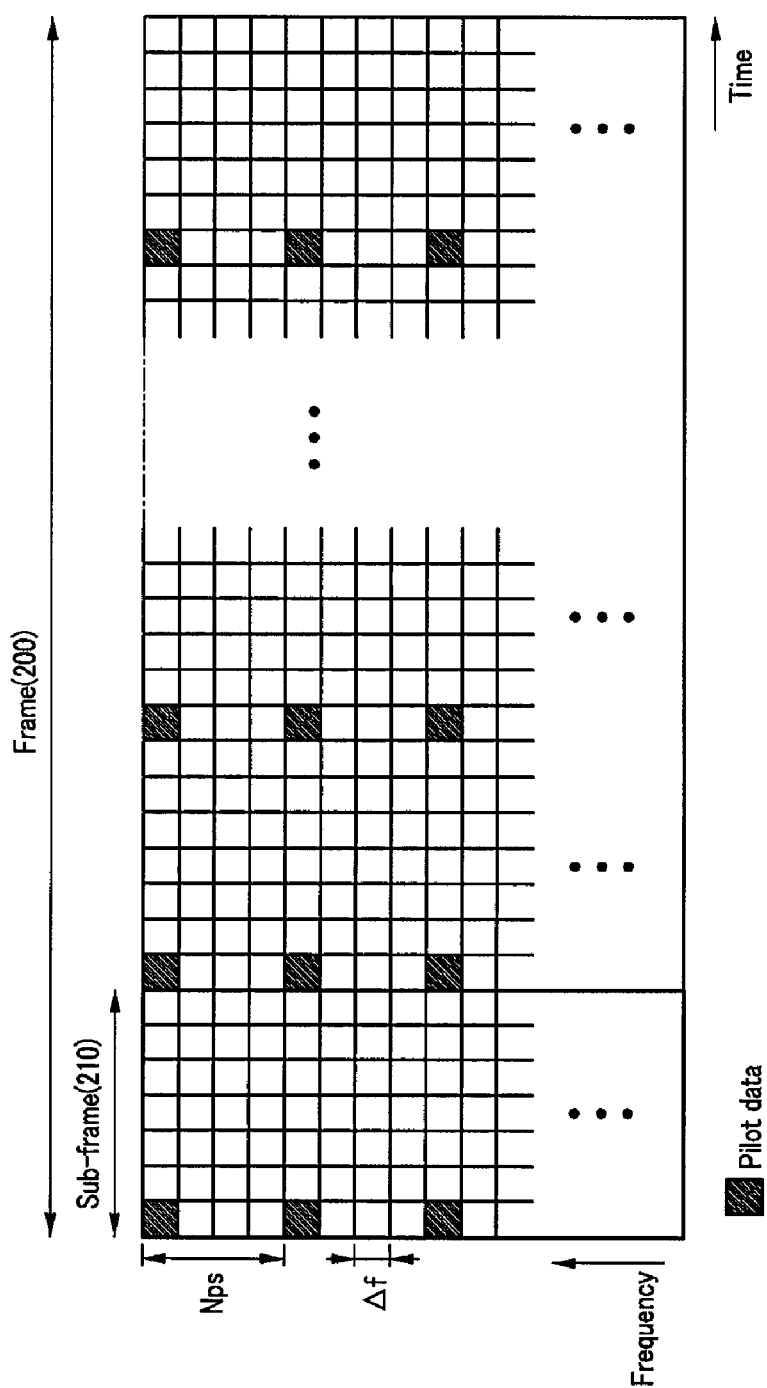

[FIG. 3]
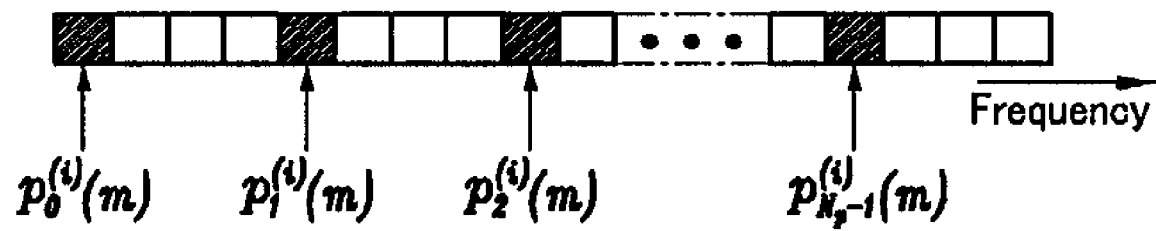

[FIG. 4]
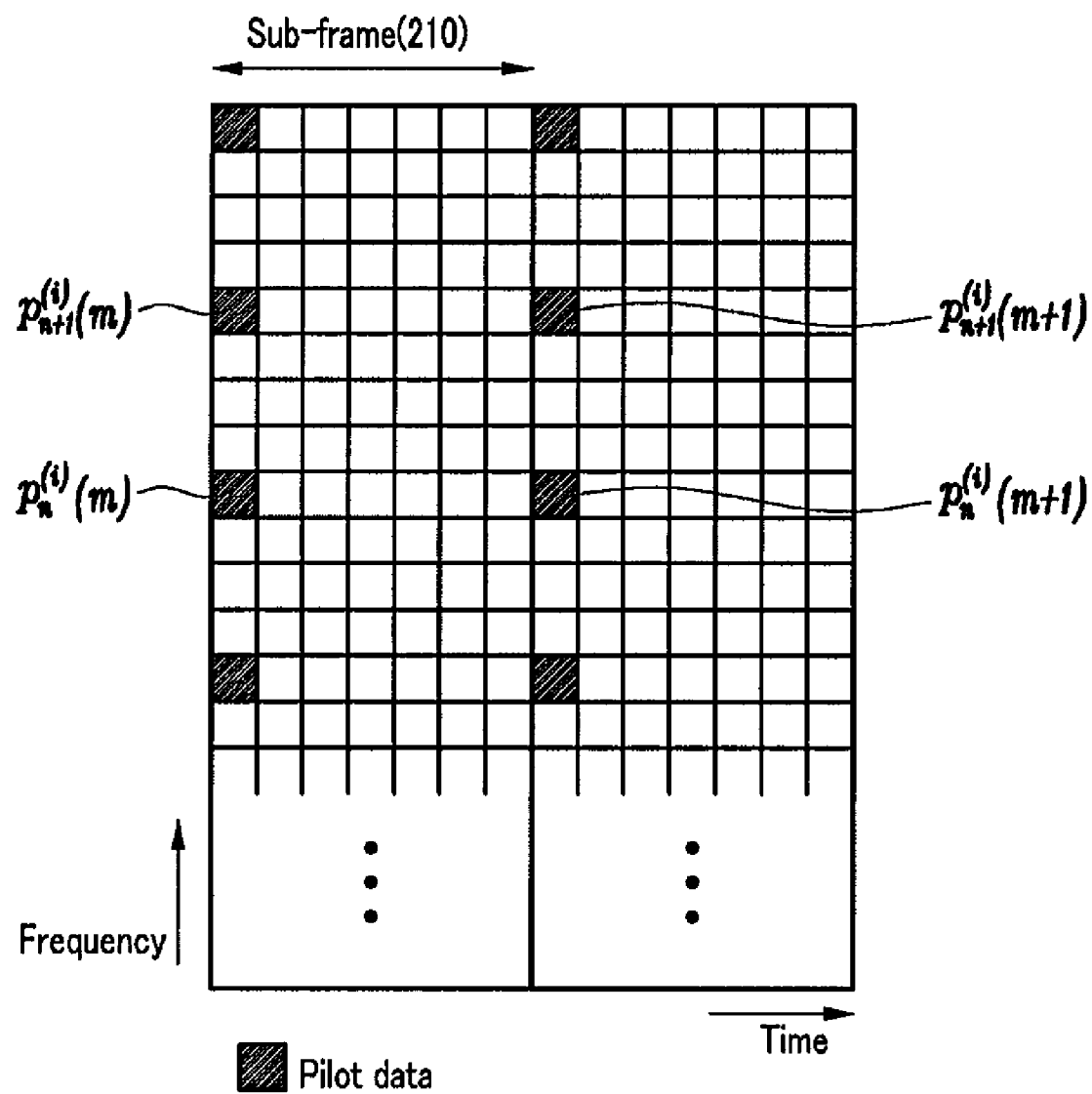

[FIG. 5]
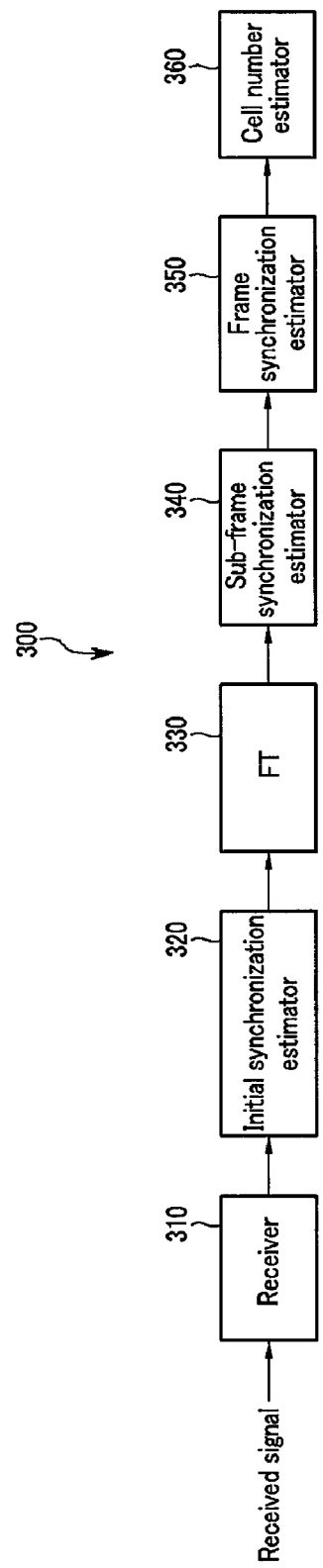

[FIG. 6]
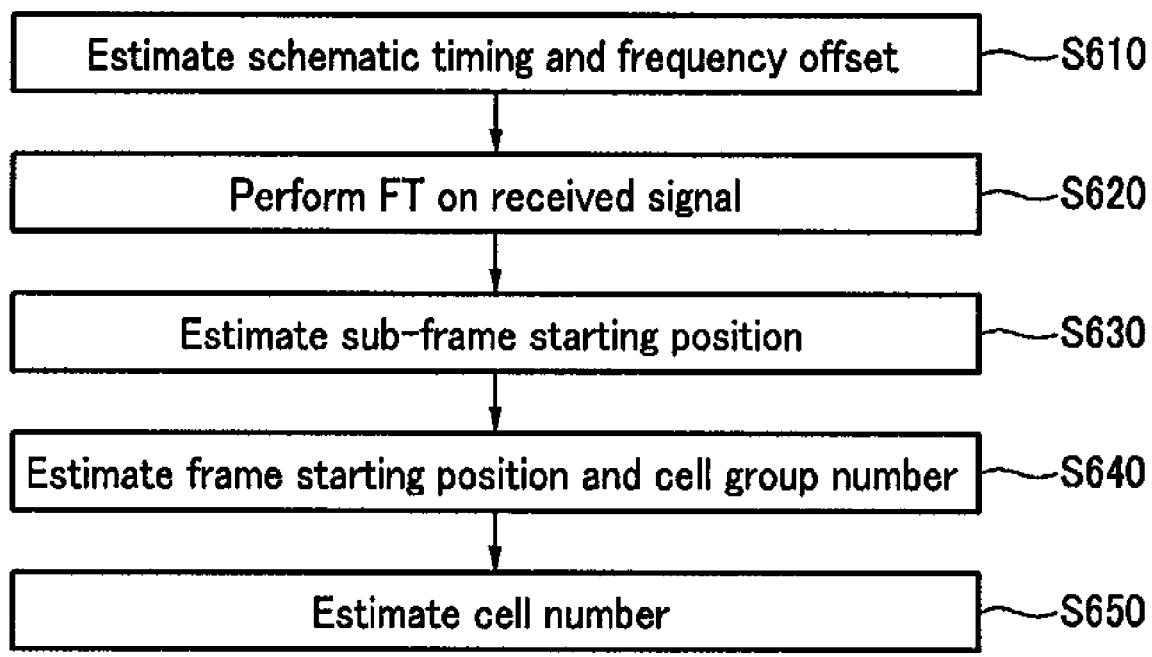

[FIG. 7]
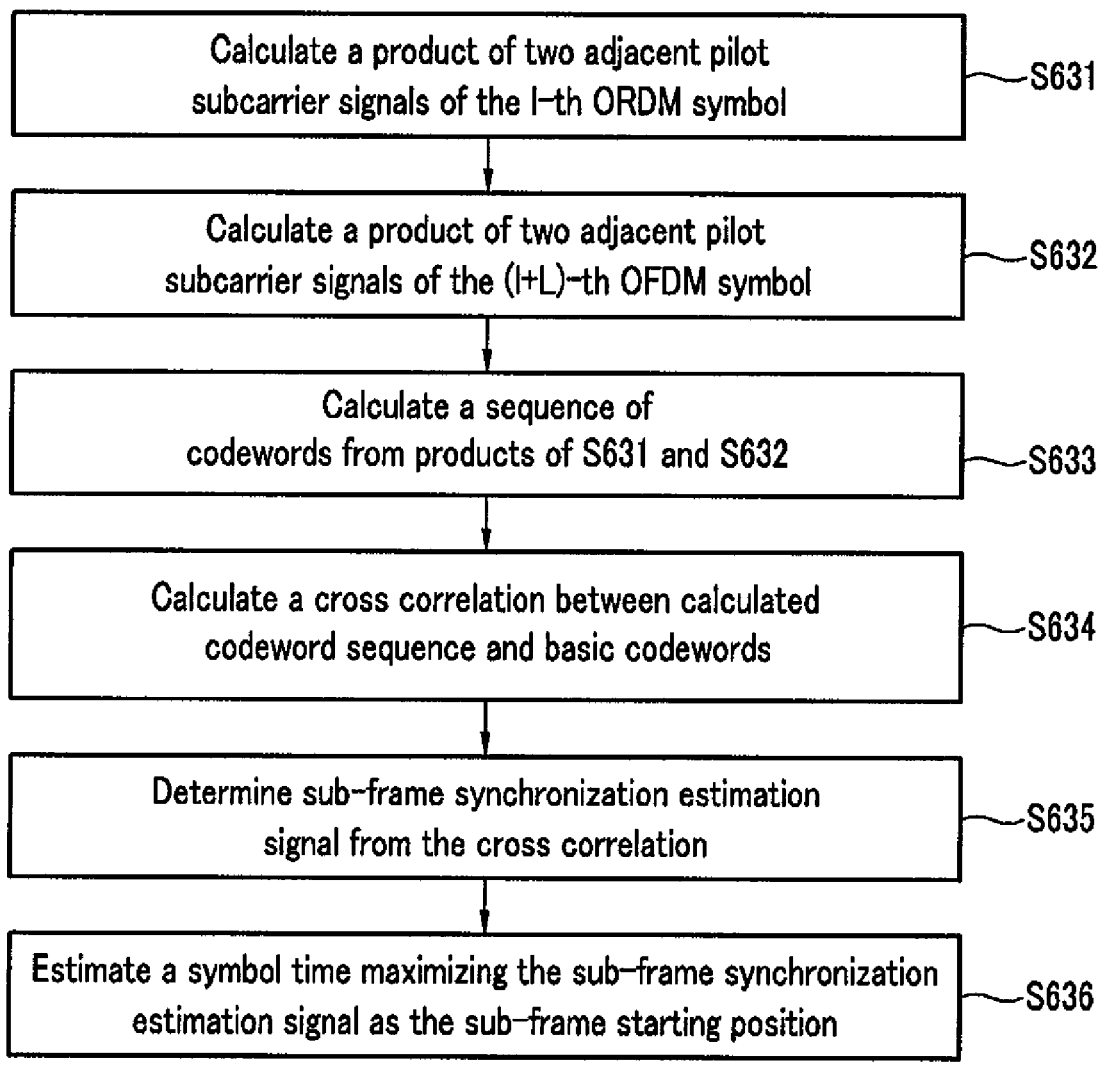

[FIG. 8]
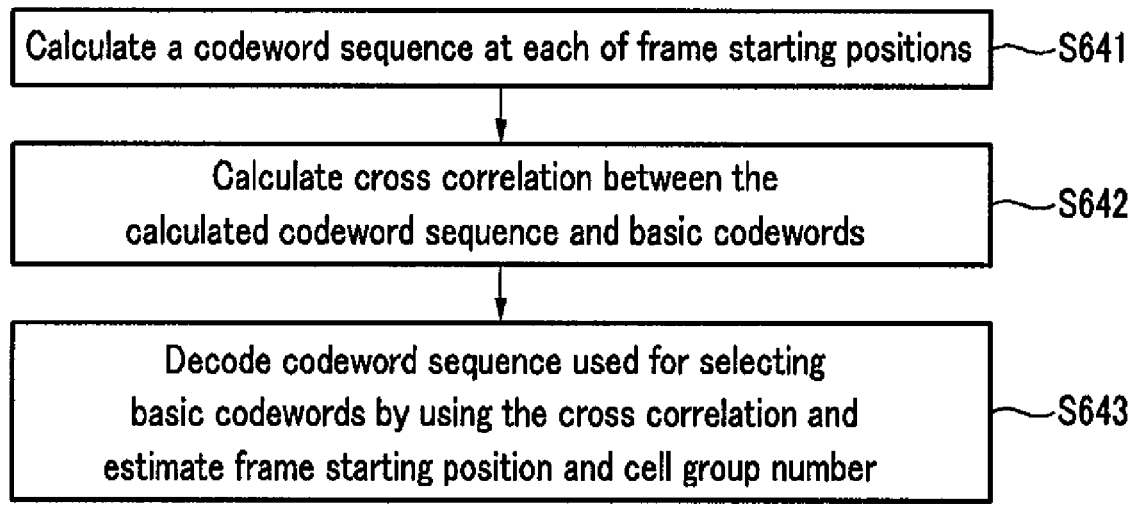

[FIG. 9]
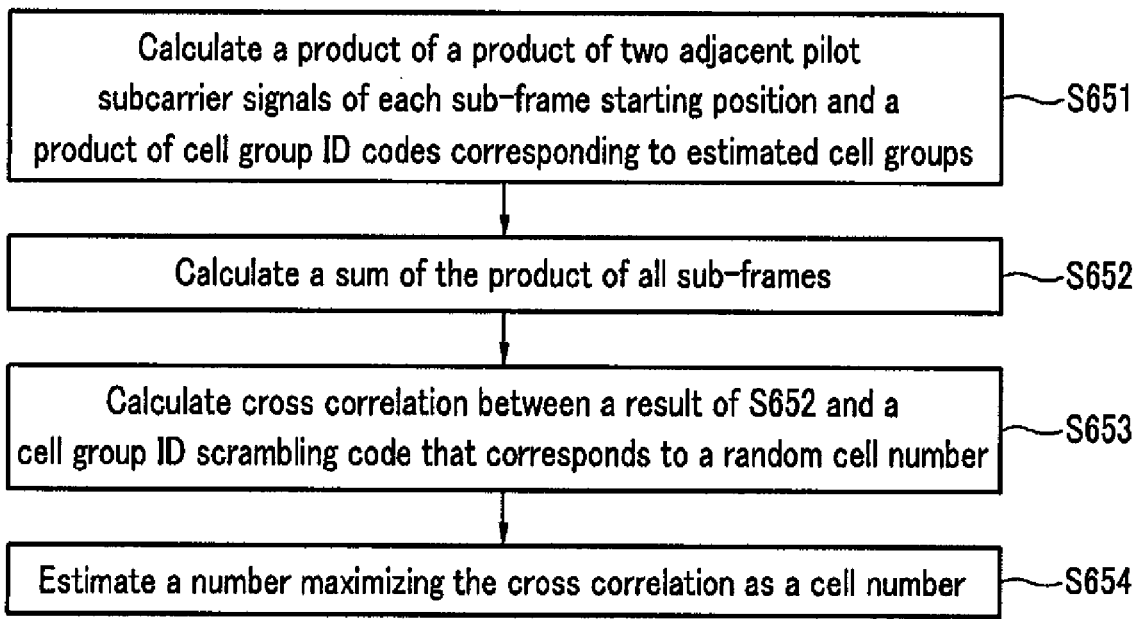

[FIG. 10]
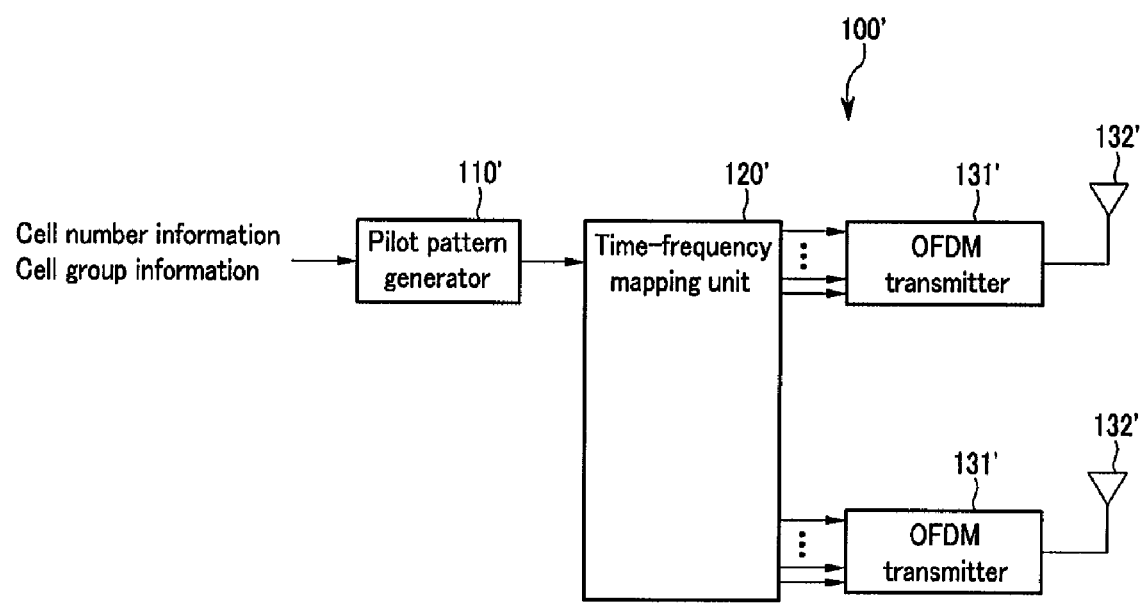

【FIG. 11】
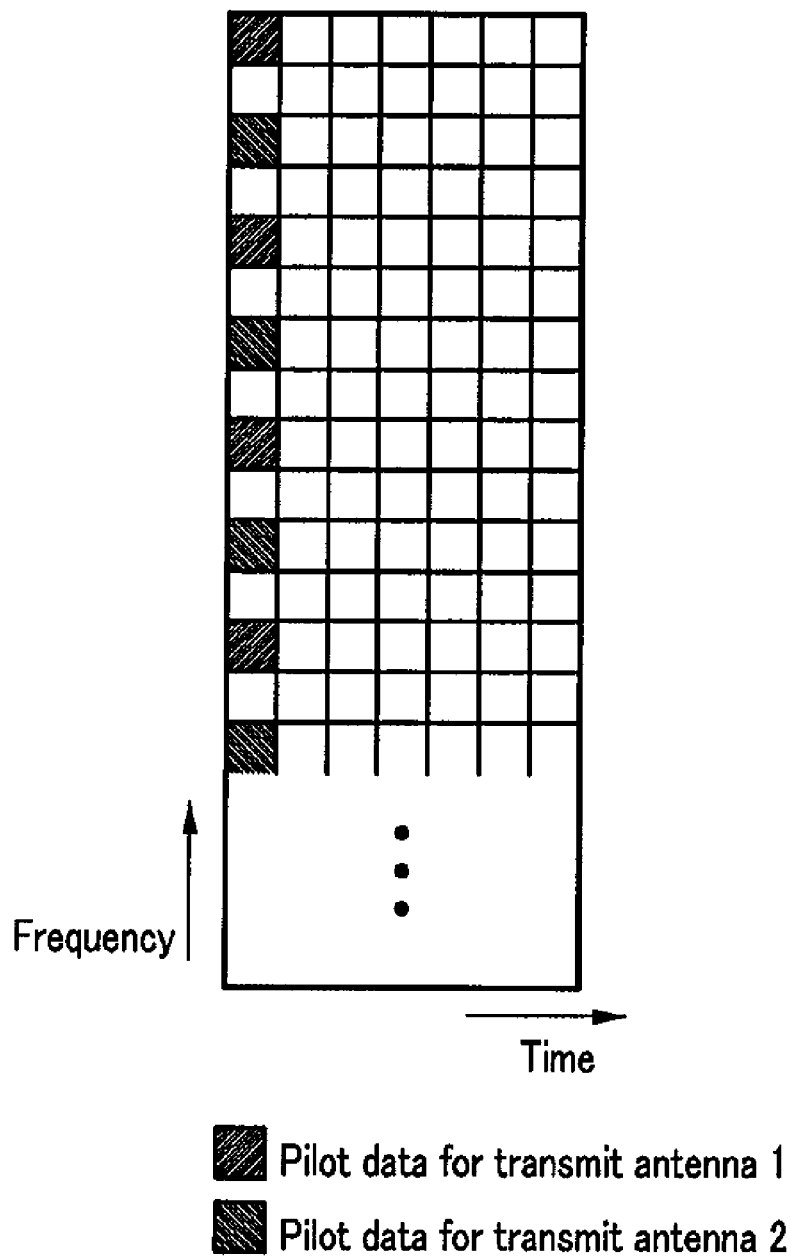

[FIG. 12]
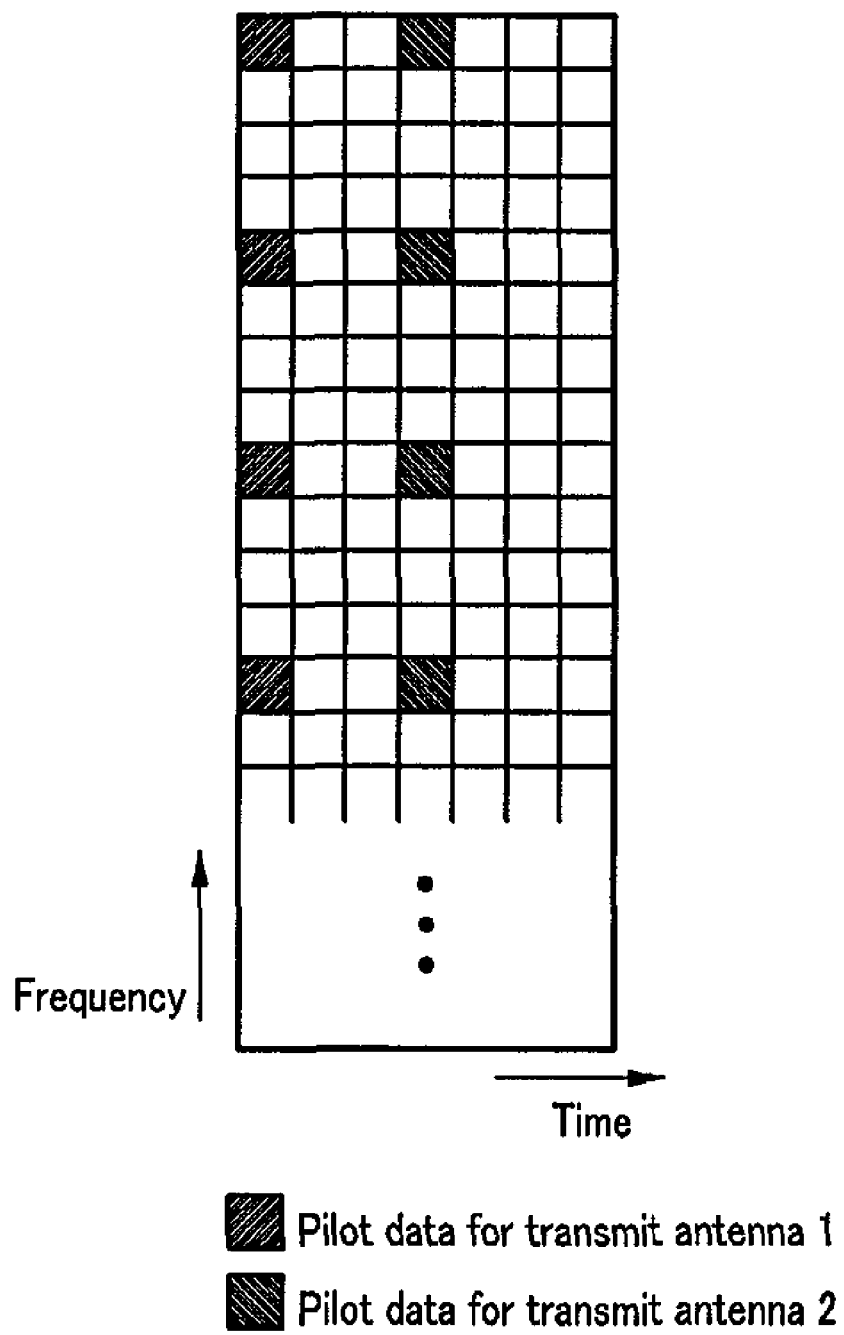

[FIG. 13]
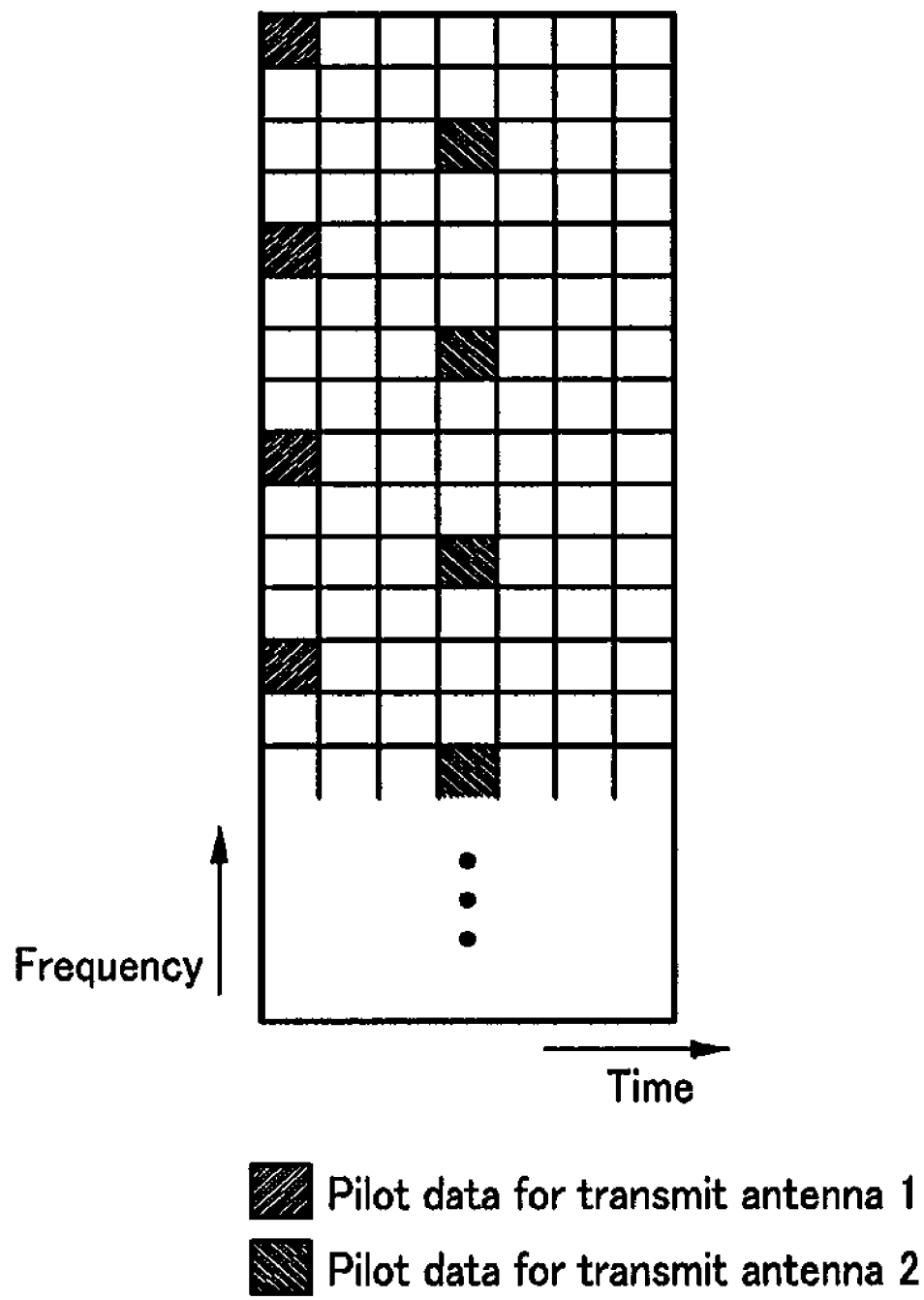

[FIG. 14]
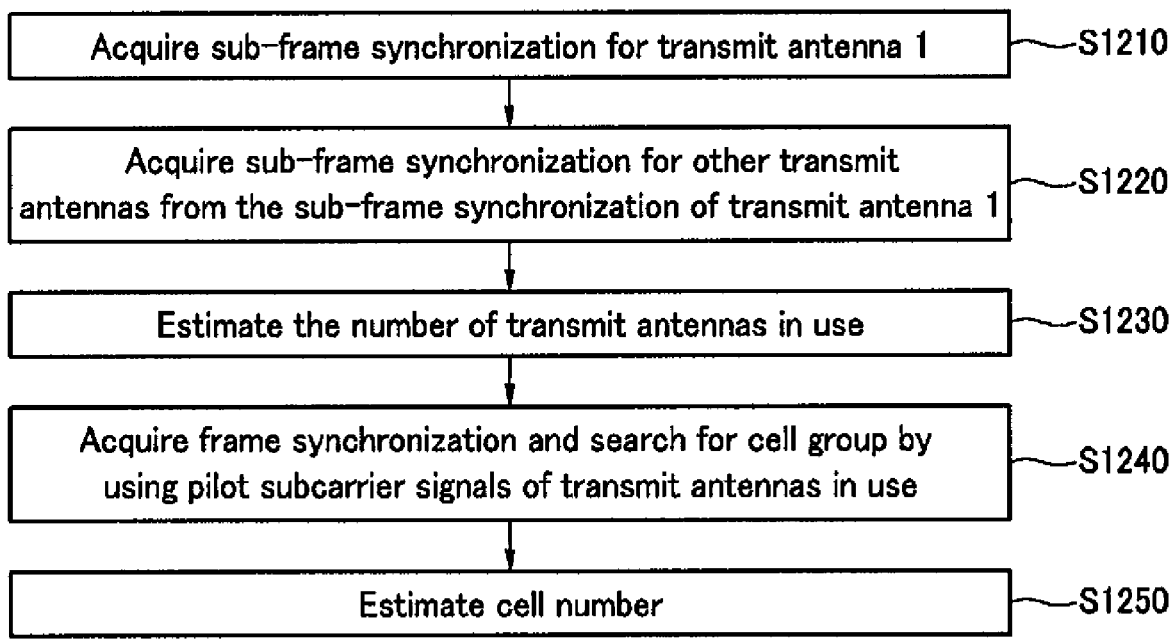

APPARATUS FOR GENERATING DOWN LINK SIGNAL, AND METHOD AND APPARATUS FOR CELL SEARCH IN CELLULAR SYSTEM

TECHNICAL FIELD

The present invention relates to a downlink signal generating method and an apparatus using the same, and a cell search method and an apparatus using the same in a cellular system. More particularly, the present invention relates to a method for searching a downlink cell in an orthogonal frequency division multiplexing (OFDM)-based cellular system.

BACKGROUND ART

In a synchronous cellular system, all base stations can achieve frame synchronization by using common time information of an external system. However, a cellular system that has been currently developed by the 3GPP is an asynchronous system where all the base stations operate based on an independent time frame. Such an asynchronous cellular system requires a complex cell search process unlike the synchronous cellular system.

Thus, a method for frame synchronization acquisition and cell search by using an additional preamble has been proposed, but this method cannot be applied to a system where no preamble exists. Another method for frame synchronization acquisition and cell search by using pilot symbols located at the beginning and the end of a sub-frame has been proposed, but this method uses too many pilot symbols.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a cell search method having an advantage of achieving frame synchronization acquisition and cell search without using a preamble in an OFDM-based cellular system, and an apparatus using the same.

Therefore, according to the present invention, pilot data is generated in accordance with a cell number and a cell group number.

Technical Solution

An exemplary downlink signal generator according to an embodiment of the present invention is provided to generate a downlink signal in an OFDM-based cellular system. The downlink signal generator includes a pilot pattern generator and a time-frequency mapping unit. The pilot pattern generator generates pilot patterns respectively corresponding to a plurality of sub-frames that form a frame of a downlink signal, and the pilot pattern is determined by a cell number and a cell group in which the cell is included. The time-frequency mapping unit maps the pilot pattern to time and frequency domains and generates a downlink signal.

According to another exemplary embodiment of the present invention, a cell search apparatus is provided to user equipment (UE) of an OFDM-based cellular system using at least one transmit antenna, and the cell search apparatus includes a receiver and first to third estimators. The receiver receives a signal of which a frame is formed of a plurality of sub-frames. In this case, each sub-frame has a plurality of OFDM symbols, and at least one pilot pattern corresponding to at least one transmit antenna is formed in at least one OFDM symbol in at least one sub-frame. The pilot pattern corresponds to a product of a cell group-specific code and a cell-specific scrambling code, and the cell group-specific code is formed by a code selected from a predetermined number of basic codes. The first estimator estimates at least one sub-frame starting point for at least one transmit antenna, and the second estimator estimates a frame starting position and a cell group number of a cell group in which a cell where the UE belongs is included by using at least one sub-frame starting position of at least one transmit antenna. In addition, the third estimator estimates a cell number of a cell where the UE is currently located by using a plurality of pilot subcarrier signals located at a frequency bandwidth where a pilot pattern is formed among a plurality of subcarrier signals of the respective OFDM symbol of each sub-frame, the sub-frame starting position, the frame starting position, the cell group number, and the cell-specific scrambling code.

An exemplary OFDM-based downlink frame generator according to another embodiment of the present invention generates an OFDM-based downlink frame to be transmitted to a plurality of cells. The downlink frame includes a plurality of sub-frames and a plurality of subcarriers, and each sub-frame includes a plurality of OFDM symbols. At least one OFDM symbol among the plurality of OFDM symbols includes a plurality of pilot symbols arranged with a first interval in a frequency domain, and the pilot symbol includes information on a cell that corresponds to the downlink frame among a plurality of cells and information on a cell group in which the cell is included.

An exemplary sub-frame synchronization acquisition method according to another embodiment of the present invention is provided to UE of an OFDM-based cellular system. In this method, cross correlations of a codeword sequence determined by a plurality of pilot subcarrier signals of the l-th OFDM symbol of at least one sub-frame and a plurality of basic codes are respectively calculated, and a sub-frame starting position is estimated from the cross correlations, respectively corresponding to the plurality of basic codes. In this case, the plurality of pilot subcarrier signals are subcarrier signals in which a plurality of pilot data are respectively located among a plurality of subcarrier signals of an OFDM symbol, wherein the plurality of pilot data are arranged in a constant interval and determined by the plurality of basic codes.

An exemplary frame synchronization acquisition method according to another embodiment of the present invention is provided to user equipment of an OFDM-based cellular system. In this method, in at least one frame, cross correlations of a codeword sequence determined by a plurality of pilot subcarrier signals of the $(\hat{l}_{sub}+kL)$-th OFDM symbol that corresponds to the k-th sub-frame starting position and a plurality of basic codes are respectively calculated. Frame synchronization is acquired and a cell group number is estimated from the plurality of cross correlations that correspond to the plurality of basic codes. In this case, the plurality of pilot subcarrier signals are formed in a constant interval in the $(\hat{l}_{sub}+kL)$-th OFDM symbol, $\hat{l}_{sub}$ denotes a sub-frame starting position, and L denotes the number of OFDM symbols included in a sub-frame. Pilot data is formed in the respective pilot subcarrier signals, and each pilot data corresponds to a product of a cell-specific scrambling code and a cell group-specific code. The cell group-specific code of the pilot data is determined by the plurality of basic codes.

A cell number estimation method according to another embodiment of the present invention is provided to user equipment of an OFDM-based cellular system. In this method, a plurality of first signals are calculated from a plurality of pilot subcarrier signals of the $(\hat{l}_{sub}+kL)$-th OFDM symbol that corresponds to the k-th sub-frame starting position, and a plurality of second signals that respectively correspond to the plurality of first signals are calculated in at least one sub-frame. In addition, for each cell number belonging to a cell group in which user equipment is currently located, cross correlations between the plurality of second signals and a value that corresponds to a cell-specific scrambling code for each cell number are calculated, and a cell number is estimated from a value that corresponds to the cross correlations. In this case, the plurality of pilot subcarrier signals are formed in a constant interval in the $(\hat{l}_{sub}+kL)$-th OFDM symbol, $\hat{l}_{sub}$ denotes a sub-frame starting position, and L denotes the number of OFDM symbols included in a sub-frame. Pilot data is formed in the respective pilot subcarrier signals, and the pilot data is determined by a cell-specific scrambling code.

A cell search method according to another embodiment of the present invention is provided to user equipment of an OFDM-based cellular system using a plurality of transmit antennas. In this method, sub-frame synchronization for a first transmit antenna among the plurality of transmit antennas is acquired, and sub-frame synchronizations for the other transmit antennas are acquired from the sub-frame synchronization of the first transmit antenna. In addition, the number of transmit antennas used by the user equipment among the plurality of transmit antennas is estimated, and frame synchronization is acquired and a cell group is searched by using received signals of the transmit antennas used by the user equipment. A cell is searched by using the received signals of the transmit antennas used by the user equipment.

DESCRIPTION OF DRAWINGS

FIG. 1 is a schematic block diagram of a downlink signal generator in a cellular system according to a first exemplary embodiment of the present invention.

FIG. 2 shows a downlink frame structure of the cellular system according to the first exemplary embodiment of the present invention.

FIG. 3 shows an OFDM symbol in which a pilot is located in the downlink frame of FIG. 2.

FIG. 4 shows a product of four pilot symbols.

FIG. 5 is a schematic block diagram of a cell search apparatus according to the first exemplary embodiment of the present invention.

FIG. 6 is a flowchart showing a cell search process according to the first exemplary embodiment of the present invention.

FIG. 7 shows a sub-frame synchronization estimation process according to the first exemplary embodiment of the present invention.

FIG. 8 shows frame synchronization and cell group number estimation processes according to the first exemplary embodiment of the present invention.

FIG. 9 shows a cell number estimation process according to the first exemplary embodiment of the present invention.

FIG. 10 is a schematic block diagram of a downlink signal generator in a cellular system according to a second exemplary embodiment of the present invention.

FIG. 11 to FIG. 13 respectively show a sub-frame structure of a downlink signal in the cellular system according to the second exemplary embodiment of the present invention.

FIG. 14 is a flowchart of a cell search process according to the second exemplary embodiment of the present invention.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive, and like reference numerals designate like elements throughout the specification.

In addition, unless explicitly described to the contrary, the word "comprise" or variations such as "comprises" or "comprising" will be understood to imply the inclusion of stated elements but not the exclusion of any other elements.

A downlink signal generator, and a cell search method and an apparatus using the same in a cellular system according to an embodiment of the present invention will now be described with reference to the accompanying drawings.

FIG. 1 is a schematic block diagram of a downlink signal generator in a cellular system according to a first exemplary embodiment of the present invention, and FIG. 2 shows a downlink frame structure of the cellular system according to the first exemplary embodiment of the present invention.

As shown in FIG. 1, a downlink signal generator 100 according to the first exemplary embodiment of the present invention includes a pilot pattern generator 110, a time-frequency mapping unit 120, an orthogonal frequency division multiplexing (OFDM) transmitter 131, and a transmit antenna 132, and the downlink signal generator 100 is provided in a base station (now shown) in the cellular system.

The pilot pattern generator 110 generates a pilot pattern of a downlink signal by using cell number information and cell group information. The time-frequency mapping unit 120 receives the pilot pattern generated by the pilot pattern generator 110 and frame structure information and transmission traffic data from an external source, and forms a frame 200 of FIG. 2 of a downlink signal by mapping the data to the time and frequency domains. The OFDM transmitter 131 receives a downlink signal from the time-frequency mapping unit 120 and transmits the downlink signal through the transmit antenna 132.

As shown in FIG. 2, a single frame 200 of the downlink signal is formed of $N_{sub}$ sub-frames 210 and uses $N_t$ subcarriers, each having a frequency width of $\Delta f$ in the cellular system according to the first exemplary embodiment of the present invention. Each sub-frame 210 is formed of L OFDM symbols, and in each sub-frame 210, pilot symbols are located at one or more OFDM symbols and the spacing between pilot symbols is $N_{ps}$ and the total number of pilot symbols is $N_0$. In the case that the pilot spacing $N_{ps}$ is chosen to be narrower than the coherence bandwidth, adjacent pilot symbols can be considered to experience the same channel.

A method for generating a pilot pattern in the pilot pattern generator 110 of FIG. 1 will now be described in more detail with reference to FIG. 3 and FIG. 4.

FIG. 3 shows an OFDM symbol in which a pilot is located in the downlink frame of FIG. 2, and FIG. 4 shows a product of four pilot symbols.

As shown in FIG. 3, the n-th pilot symbol $P_n^{(i)}(m)$ on the frequency axis in the m-th sub-frame 210 of the i-th cell is given by the product of a scrambling code $s_n^{(i)}$ for the i-th cell and a cell-group specific code $a_n^{(g)}(m)$ for a cell-group g as given in Equation 1.

$$p_n^{(i)}(m) = s_n^{(i)} a_n^{(g)}(m), n=0, 1, \ldots, N_0-1 \quad \text{[Equation 1]}$$

In this case, the pilot pattern generator 110 allocates a cell-specific scrambling code $\{s_n^{(i)}\}_{n=0}^{N_0-1}$ to each cell, and allocates the same scrambling code $\{s_n^{(i)}\}_{n=0}^{N_0-1}$ to pilot symbols for all the sub-frames in the cell. In addition, the pilot pattern generator 110 generates a unique cell group-specific code $\{a_n^{(g)}(m)\}_{n=0}^{N_0-1}$ for the cell-group g, and allocates a different cell group-specific code $\{a_n^{(g)}(m)\}_{n=0}^{N_0-1}$ to each sub-frame. Therefore, cells in the same group use a cell-specific scrambling code $\{s_n^{(i)}\}_{n=0}^{N_0-1}$ but use the same cell group-specific code $\{a_n^{(g)}(m)\}_{n=0}^{N_0-1}$. All the sub-frames in a frame have different pilot patterns from each other.

Subsequently, a product of a cell group-specific code $a_n^{(g)}(m)$ of the n-th pilot symbol and a Hermitian transpose matrix an $a_{n+1}^{(g)}(m)^*$ of a cell group-specific code $a_{n+1}^{(g)}(m)$ of the (n+1)-th pilot symbol in the m-th sub-frame is defined as given in Equation 2. In addition, the product of the n-th $b_n^{(g)}(m)$ of the m-th sub-frame and the n-th $b_n^{(g)}(m+1)^*$ of the (m+1)-th sub-frame is defined as given in Equation 3.

$$b_n^{(g)}(m) = a_n^{(g)}(m) a_{n+1}^{(g)}(m)^*, n=0, 1, \ldots, N_0-2 \quad \text{[Equation 2]}$$

$$c_n^{(g)}(m) = b_n^{(g)}(m) b_n^{(g)}(m+1)^*, n=0, 1, \ldots, N_0-2 \quad \text{[Equation 3]}$$

When four pilot symbols $p_n^{(i)}(m)$, $p_{n+1}^{(i)}(m)$, $p_n^{(i)}(m+1)$, and $p_{n+1}^{(i)}(m+1)$ are selected for a pilot symbol $p_n^{(i)}(m)$ as shown in FIG. 4, the product of the four pilot symbols can be defined as given in Equation 4. That is, the pilot pattern generator 110 can sequence the product of four pilot symbols to be determined by a cell group-specific code without regarding a cell number.

$$p_n^{(i)}(m) p_{n+1}^{(i)}(m)^* p_n^{(i)}(m+1) p_{n+1}^{(i)}(m+1)^* = c_n^{(g)}(m) \quad \text{[Equation 4]}$$

Accordingly, a sequence of sequences $c_n^{(g)}(m)_s$ appearing within the m-th sub-frame can be represented by a vector $c^{(g)}(m) = [c_0^{(g)}(m), c_1^{(g)}(m), \ldots, c_{N_0-2}^{(g)}(m)]$. Herein, the pilot pattern generator 110 may determine $c^{(g)}(m)$ by using difference codes for all groups g and all sub-frames m. In this case, however, the cell search apparatus of the UE has to search too many codes, and therefore, the pilot pattern generator 110 may determine $c^{(g)}(m)$ by using one element of a J basic code set $\{e_0, e_1, \ldots, e_{J-1}\}$ as given in Equation 5.

$$c^{(g)}(m) \in \{e_0, e_1, \ldots, e_{J-1}\} \quad \text{[Equation 5]}$$

Where each element $e_i$ of $\{e_0, e_1, \ldots, e_{J-1}\}$ is a sequence of length $N_0-1$.

In this case, the pilot pattern generator 110 may select $c^{(g)}(m)$ for the cell-group g among the basic code set $\{e_0, e_1, \ldots, e_{J-1}\}$ by using a codeword sequence. For example, when the cell-group g selects $c^{(g)}(m)$ by using $\{5, 2, \ldots, 7\}$ as a codeword sequence, a relationship as in Equation 6 can be established.

$$[c^{(g)}(0), c^{(g)}(1), \ldots, c^{(g)}(N_{sub}-1)] = [e_5, e_2, \ldots, e_7] \quad \text{[Equation 6]}$$

A method for designing a codebook that contains all the possible codeword sequences associated with $c^{(g)}(m)$ according to an exemplary embodiment of the present invention will now be described.

For any codeword sequence, a cyclic-shift version of the codeword sequence should be different from any of the other codeword sequences. In designing the codebook, a minimum symbol distance of the codebook for different cyclic shift versions of the same codeword sequences should be maximized, and the minimum symbol distance of the codebook for all the possible cyclic shift versions of different codeword sequences should be maximized. Herein, the symbol distance between two codeword sequences is defined as the number of coordinates by which the two codeword sequences differ, and the minimum symbol distance is the minimum symbol distance between all distinct pairs of codeword sequences.

One example codebook that satisfies the above condition is Comma-Free Reed-Solomon (RS) codes. For an arbitrary prime q and an arbitrary positive integer m, a decoding method using an RS code determined by the parameters of $(q^m-1)$ and k generates $(q^m)^k$ codeword sequences, each having a length of $(q^m-1)$. Herein, numbers that form each codeword sequence are integers, between 0 and $(q^m-1)$. The RS code is a maximum distance separable code that achieves the maximum limit of the minimum distance known as the Singleton bound. The symbol distance is given by $q^m-1-k+1$.

The RS code has a characteristic that any cyclic shifting of a codeword results in another codeword. This characteristic may hinder timing synchronization by inducing a tendency towards an incorrect codeword. In order to eliminate such a characteristic of the RS code, it is necessary to choose a codeword sequence that does not result in the same codeword sequence by the cyclic shift operation and then form a codebook. Such a sequence of codeword can be searched from all codeword sequences, or can be prevented from being generated from the beginning by using a theoretical algorithm.

When the theoretical algorithm method is used, the number of codeword sequences generated by the RS code is reduced to $1/q^m$. Therefore, when the total number of cell groups is $G_{gr}$, q, m, and k satisfying $(q^m)^{k-1} \leq G_{gr}$ are determined. To maximize the symbol distance, k should be minimized as much as possible, and thus, q, m, and k should be determined to maximize $q^m$. Since $q^m-1 \leq N_{sub}$, ranges of q and m are limited. Herein, $J = q^m$ is determined.

When there are no q's and m's satisfying the condition, the number of cell groups or the length of codeword sequences is adjusted. The length $q^m-1$ of the codeword is chosen to be near but larger than $N_{sub}$ and the codeword length is shortened to equate the length to $N_{sub}$, but, in this case, the number of elements in the codeword sequence increases. Therefore, it is preferred to choose a large q with $q^m-1 \leq N_{sub}$. In this case, when the codeword length $(q^m-1)$ is less than $N_{sub}$, an extra space is generated. In this case, the codeword length can be enlarged to $N_{sub}$ by disposing a copy of a given part of each codeword sequence in the extra space. When using the RS code, the symbol distance can be maximized by allocating adjacent symbols at the beginning portion of the codeword sequence or adjacent symbols at the end portion of the codeword sequence to the extra space. In this case, each symbol of the codeword sequence can be realized by $q^m$ binary sequences, respectively corresponding to each symbol. For distinct classification of each symbol of $q^m$ symbols, each symbol can be represented by corresponding binary orthogonal code to each symbol.

As described, the downlink signal generator according to the first exemplary embodiment of the present invention generates a pilot pattern, and represents the pilot pattern by a product of a cell group-specific code and a cell-specific scrambling code for synchronization acquisition and cell search. Herein, the pilot pattern is repeated frame-by-frame and has a different value for each sub-frame. That is, cells included in the same group are allocated with the same cell group-specific code and each cell is allocated with a different scrambling code, but all sub-frames are allocated with the same scrambling code.

A method for user equipment to search cells by using a downlink signal having a pilot pattern generated through the above-process will now be described in more detail with reference to FIG. 5 and FIG. 9.

FIG. 5 is a schematic block diagram of a cell search apparatus 300 according to a first exemplary embodiment of the present invention, and FIG. 6 is a flowchart showing a cell search process according to the first exemplary embodiment of the present invention.

In the following description, assume that $N_p (\leq N_0)$ pilot subcarriers are supported by a bandwidth extendibility supported by the UE performing a cell search. In the case that the bandwidth supported by the UE is equal to a bandwidth supported by the base station, $N_p$ can be maximized to $N_0$.

As shown in FIG. 5, the cell search apparatus 300 according to the first exemplary embodiment of the present invention includes a receiver 310, an initial synchronization estimator 320, a Fourier transform (FT) 330, a sub-frame synchronization estimator 340, a frame synchronization estimator 350, and a cell number estimator 360, and the FT 330 may be provided as a fast Fourier transform (FFT).

As shown in FIG. 6, the receiver 310 receives a signal transmitted from the base station, and the initial synchronization estimator 320 estimates timing and frequency offset by measuring a repeated signal in a guard interval of the received signal, in step S610. For instance, the initial synchronization estimator 320 may estimate the timing and frequency offset for performing the Fourier transform for the received signal by using correlation between the received signal and a cyclic prefix. Subsequently, the FT 330 performs FFT on the received signal based on the timing estimated by the initial synchronization estimator 320 in step S620. The sub-frame synchronization estimator 340 estimates a sub-frame start position by using a Fourier transformed received signal in step S630, and the frame synchronization estimator 350 estimates frame synchronization and a cell group number based on the estimated sub-frame start point in step S640. The cell number estimator 360 estimates a cell number based on the estimated frame synchronization and cell group number in step S650.

A process (S630) for estimating sub-frame synchronization in the sub-frame synchronization estimator 340 will now be described in more detail with reference to FIG. 7. FIG. 7 shows a sub-frame synchronization estimation method according to the first exemplary embodiment of the present invention.

Among subcarrier signals formed in a received OFDM symbol, a subcarrier located in a frequency bandwidth in which pilot data is formed is called a "pilot subcarrier signal" in the following description.

After experiencing FT by the FT 320, the n-th pilot subcarrier signal $r_n(l)$ at the l-th received OFDM symbol can be written as Equation 7. If it is assumed that l indicates transmission time of a pilot of the m-th sub-frame, the n-th pilot subcarrier signal $r_n(l)$ can be rewritten as Equation 8.

$$r_n(l) = H_n^{(i)}(l) X_n^{(i)}(l) + W_n^{(i)}(l) \quad \text{[Equation 7]}$$

Here, $H_n^{(i)}(l)$ represents a channel coefficient of the i-th cell, $W_n^{(i)}(l)$ represents a sum of interference from other cells and additive noise, and $X_n^{(i)}(l)$ represents the n-th pilot subcarrier signal at the n-th received OFDM symbol.

$$r_n(l) = H_n^{(i)}(l) s_n^{(i)}(l) a_n^{(g)}(m) + W_n^{(i)}(l) \quad \text{[Equation 8]}$$

The sub-frame synchronization estimator 340 obtains a product $u_n(l)$ of two adjacent pilot subcarrier signals in the l-th received OFDM symbol in step S631, and obtains a product $u_n(l+L)$ of two adjacent pilot subcarrier signals in a symbol that is L OFDM symbols away from the l-th received OFDM symbol in the time domain, in step S632. Then, the sub-frame synchronization estimator 340 obtains a product $y_n(l)$ of $u_n(l)$ and $u_n(l+L)$ as given in Equation 10, in step S633. Since it is assumed that the UE supports $N_p$ bandwidths, a product of n, which is from 0 to $(N_p-2)$, can be calculated through Equation 9 and Equation 10.

$$u_n(l) = r_n(l) r_{n+1}(l)^*, n = 0, 1, \ldots, N_p-2$$

$$u_n(l+L) = r_n(l+L) r_{n+1}(l+L)^*, n = 0, 1, \ldots, N_p-2 \quad \text{[Equation 9]}$$

$$y_n(l) = u_n(l) u_n(l+L)^*, n = 0, 1, \ldots, N_p-2 \quad \text{[Equation 10]}$$

Where L is the total number of OFDM symbols in a sub-frame and indicates a time interval between two adjacent pilot subcarrier signals in the time domain.

The sub-frame synchronization estimator 350 calculates a cross correlation $Z^{(j)}(l)$ between $\{y_n(l)\}_{n=0}^{N_p-2}$ and the basic codes $e_0, e_1, \ldots, e_{J-1}$ by using J correlator banks (not shown) as given in Equation 11, in step S634. The sub-frame synchronization estimator 350 determines a sub-frame synchronization estimation signal P(l) by a sum of the J cross correlations $Z^{(j)}(l)$ of L OFDM symbols in one frame in step S635.

$$Z^{(j)}(l) = \sum_{n=0}^{N_p-2} y_n(l) e_{j,n}^*, j = 0, 1, \ldots, J-1 \quad \text{[Equation 11]}$$

$$P(l) = \sum_{j=0}^{J-1} |Z^{(j)}(l)|, l = 0, 1, \ldots, L-1 \quad \text{[Equation 12]}$$

The sub-frame synchronization estimator 340 estimates a symbol time giving the maximum sub-frame synchronization estimation signal P(l) as given in Equation 13 among the L symbol times as the start position of the sub-frame $\hat{l}_{sub}$, in step S636.

$$\hat{l}_{sub} = \arg\max_l P(l), l = 0, 1, \ldots, L-1 \quad \text{[Equation 13]}$$

Here, the sub-frame synchronization estimator 340 may sequence P(l) to a maximum value j of the correlation $Z^{(j)}(l)$ as given in Equation 14. In addition, the sub-frame synchronization estimator 350 may replace $Z^{(j)}(l)$ in Equation 12 and Equation 14 with a combination of $Z^{(j)}(l)$s from multiple symbols, each separated by L symbols.

$$P(l) = \max_j |Z^{(j)}(l)|, l = 0, 1, \ldots, L-1 \quad \text{[Equation 14]}$$

Subsequently, a process (S640) for the frame synchronization estimator 350 to acquire frame synchronization and estimate a cell group number based on the sub-frame starting position $\hat{l}_{sub}$ will now be described in more detail with reference to FIG. 8. FIG. 8 shows a process for acquiring frame synchronization and estimating a cell group number according to the first exemplary embodiment of the present invention.

The frame synchronization estimator 350 calculates a cross correlation $Z_k^{(j)}$ between $\{y_n(\hat{l}_{sub}+kL)\}_{n=0}^{N_p-2}$ and each basic code $e_j$ for $N_{sub}$ sub-frames based on the sub-frame starting position $\hat{l}_{sub}$ as given in Equation 15, in step S641. In this case, the frame synchronization estimator 350 may perform normalization in Equation 15 to reduce the effect of channel variations in the time and frequency domains.

$$Z_k^{(j)} = \sum_{n=0}^{N_p-2} y_n(\hat{l}_{sub}+kL)e_{j,n}^*, \; j=0,1, \quad \text{[Equation 15]}$$

$$\ldots, J-1, k=0,1,\ldots,N_{sub}-1$$

Then, the frame synchronization estimator 350 acquires frame synchronization and estimates a cell group number by decoding the codewords used for basic code selection with cross correlation $Z_k^{(j)}$, in step S643.

For example, when the codewords are encoded to the RS code by the downlink signal generator 100, the frame synchronization estimator 350 may decode the RS code for the codeword of length J for $Z_k^{(j)}$. That is, the frame synchronization estimator 350 may perform decoding by employing a Berlekamp-Massey algorithm, the Berlekamp-Massey algorithm being a soft decision decoding method for RS codes. However, since a sequence of symbols is formed by selecting a portion among the overall codewords, a number that is not allocated with a cell group may become a decoding result. Therefore, rather than using the RS code decoding method, the frame synchronization estimator 350 may compare symbol distances between each codeword of partial codeword sequences and a sequence of $\{Z_k^{(j)}\}$ with a length J. Herein, the partial codeword sequences denote codeword sequences respectively allocated to a cell group number and their cyclic-shifted codeword sequences. However, this method corresponds to the soft decision decoding method, and therefore, soft decision information can be used for better performance. That is, the frame synchronization estimator 350 applies a soft decision value of $Z_k^{(j)}$ to Equation 16, and searches for g and m that maximize $G^{(g)}(m)$ such that a cell group number and frame synchronization can be estimated. Thus, the frame synchronization estimator 350 obtains cell group number $\hat{g}_0$ and frame synchronization $\hat{m}_{frame}$ frame through Equation 17.

$$G^{(g)}(m) = \sum_{k=0}^{N_{sub}-1} |Z_k^{(w_g(k+m \bmod N_{sub}))}|, \quad \text{[Equation 16]}$$

$$g=0,1,\ldots,G_{gr}-1, m=0,1,\ldots,N_{sub}-1$$

Where $G_{gr}$ denotes a cell group number, and $w_g(k)$ denotes the k-th symbol in the codewords used for selecting basic codes for cell group g.

$$\{\hat{g}_0, \hat{m}_{frame}\} = \underset{\{g,m\}}{\operatorname{argmax}} G^{(g)}(m) \quad \text{[Equation 17]}$$

To improve performance of frame synchronization acquisition and cell group search, the frame synchronization estimator 350 may replace $Z_k^{(j)}$ with a combination of $Z_k^{(j)}$s from multiple sub-frames.

When the UE is aware of information (i.e., cell number and cell group information) on a cell in which the UE is currently located and neighboring cells, that is, when the UE is on a call or waiting for a call, the cell search is performed on cell groups to which the current cell and the neighboring cells belong, thereby reducing the amount of calculation and time.

That is, in Equation 16 and Equation 17, $G^{(g)}(m)$ only for the cell groups where the current cell and the neighboring cells belong can be calculated.

A process (S650) for estimating a cell number by using the estimated cell group number $\hat{g}_0$ and the frame synchronization frame $\hat{m}_{frame}$ will now be described with reference to FIG. 9. FIG. 9 shows a cell number estimation method according to the first exemplary embodiment of the present invention.

The cell number estimator 360 calculates a 3) product of a 1) product $r_n(\hat{l}_{sub}+kL)r_{n+1}(\hat{l}_{sub}+kL)^*$ of two adjacent pilot subcarrier signals at the starting position of each sub-frame and a 2) product $a_n^{(\hat{g}_0)}(k-\hat{m}_{frame})^*a_{n+1}^{(\hat{g}_0)}(k-\hat{m}_{frame})$ of cell group-specific codes corresponding to the estimated cell group $\hat{g}_0$, in step S651, and obtains a sum $v_n$ of the 3) products for all the sub-frames in step S652. In this case, the cell number estimator 360 may perform normalization to reduce the effect of channel variation in the time and frequency domains.

$$v_n = \sum_{k=0}^{N_{sub}-1} \{r_n(\hat{l}_{sub}+kL)r_{n+1}(\hat{l}_{sub}+kL)^*\} \quad \text{[Equation 18]}$$

$$a_n^{(\hat{g}_0)}(k-\hat{m}_{frame})^* a_{n+1}^{(\hat{g}_0)}(k-\hat{m}_{frame}),$$

$$n=0,1,\ldots,N_p-2$$

The cell number estimator 360 calculates cross correlation $Q^{(i)}$ between $v_n$ and a cell-specific scrambling code that correspond to cell number i of cell-group $\hat{g}_0$, as given in Equation 19, in step S653. In addition, the cell number estimator 360 estimates $\hat{i}_0$ that maximizes $Q^{(i)}$ as a cell number, as given in Equation 20, in step S654. In this case, to improve cell number search performance, the cell number estimator 360 may replace $Q^{(i)}$ with a combination of $Q^{(i)}$s from multiple sub-frames in Equation 20.

$$Q^{(i)} = \sum_{n=0}^{N_p-2} (s_{n+1}^{(i)} s_n^{(i)*}) v_n, \quad \text{[Equation 19]}$$

i∈{cell number belonging to cell group $\hat{g}_0$}

$$\hat{i}_0 = \underset{i}{\operatorname{argmax}} |Q^{(i)}|, \quad \text{[Equation 20]}$$

i∈{cell number belonging to cell group $\hat{g}_0$}

When the UE is already aware of information (i.e., cell number and cell group information) on a cell in which the UE is currently located and neighboring cells, the cell number estimator 360 may calculate $Q^{(i)}$ only for the current cell number and the neighboring cell numbers through Equation 19 and Equation 20 to reduce the amount of calculation and time in the cell search.

The cell search apparatus 300 according to the first exemplary embodiment of the present invention may search a cell number by using a pilot pattern of a downlink signal.

Designing basic code set $\{e_0, e_1, \ldots, e_{J-1}\}$ used for the cell search according to an exemplary embodiment of the present invention will now be described.

As previously described, since characteristics of correlation between the basic codes set $\{e_0, e_1, \ldots, e_{J-1}\}$ in the synchronization acquisition process and the cell search process greatly affect performance, basic codes having good cross correlation between codes can be selected. As written in Equation 3 and Equation 5, the basic code set $\{e_0, e_1, \ldots, e_{J-1}\}$ is determined to be represented as a product of the two sequences of codewords $\{b_n^{(g)}(m)\}_{n=0}^{N_p-2}$ and $\{b_n^{(g)}(m+1)^*\}_{n=0}^{N_p-2}$.

In order to satisfy the above characteristics, a Walsh code may be used to form the basic code set $\{e_0, e_1, \ldots, e_{J-1}\}$ according to an exemplary embodiment of the present invention. The Walsh code multiplication is a closed set, and thus, a product of elements of a codeword sequence included in a Walsh code corresponds to an element of another codeword sequence of the Walsh code. Therefore, the Walsh code may be applied to $\{b_n^{(g)}(m)\}_{n=0}^{N_p-2}$ and $\{b_n^{(g)}(m+1)^*\}_{n=0}^{N_p-2}$.

Such a Walsh code, which is a representative example of a binary orthogonal code, defines $2^n$ orthogonal sequences for an arbitrary positive integer n. In this case, when the size $N_p$ of a resource allocated for each symbol does not correspond to the length ($N=2^n$) of the Walsh code, the first adjacent binary symbol of $(N_p-1-N)/2$ of the Walsh code and the last adjacent binary symbol of $(N_p-1-N)/2$ of the Walsh code are attached at the beginning and end of the Walsh code respectively such that a codeword sequence that corresponds to a symbol of length $N_p$ can be formed. Therefore, a Walsh code with a variety of lengths can be generated. For example, when the maximum size of a resource available for each UE is $N_{p,max}$, the maximum length $N_{max}$ of the Walsh code can be set to a number corresponding to the maximum power of 2 (i.e., $2^n$), which is less than $N_{p,max}$.

In addition, the above-described method can be applied to $(N_{p,max} - N_{max})$ remaining resources. Then, the Walsh code of length $N_{max}$ can be generated by using the generator matrix of Equation 21.

$$H_n = \begin{bmatrix} H_{n-1} & H_{n-1} \\ H_{n-1} & -H_{n-1} \end{bmatrix}, \quad \text{[Equation 21]}$$

$$H_2 = \begin{bmatrix} 1 & 1 \\ 1 & -1 \end{bmatrix}, n = 3, \ldots, \log_2 N_{max}$$

A number for a codeword sequence of the Walsh code is determined by a row number of each generator matrix $H_n$. In this case, when the size of an available resource for the UE is $N_p$, a resource matrix for a Walsh code sequence can be generated by using elements from the $((N_{max}-N_p)/2+1)$-th column to the $((N_{max}+N_p)/2+1)$-th column of the first row to the $(2^{\lfloor \log_2 N_p \rfloor})$-th row of the $H_{\log_2 N_{max}}$ matrix. A repetitive operation for the $(N_p - 2^{\lfloor \log_2 N_p \rfloor})$ remaining resources can be simultaneously performed in a manner as described above. Therefore, a Walsh code generator matrix $H_{N_p}$ for the UE having an available resource of size $N_p$ can be obtained as given in Equation 22.

erator matrix for the UE having a resource of size $N_p$ by cutting off a portion of a generator matrix $H_{\log_2 N_{max}}$ having the maximum resource size.

When $\{b_n^{(g)}(m)\}_{n=0}^{N_p-2}$ is determined, one example of setting $a_n^{(g)}(m)$ that satisfies $b_n^{(g)}(m) = a_n^{(g)}(m)a_{n+1}^{(g)}(m)^*$ is to set $a_n^{(g)}(m)$ in a differential form as given in Equation 23.

$$a_0^{(g)}(m) = 1, a_n^{(g)}(m) = b_0^{(g)}(m)b_1^{(g)}(m) \ldots b_{n-1}^{(g)}(m),$$
$$n = 1, 2, \ldots, N_p - 1$$

$$\text{or } a_n^{(g)}(m) = a_{n-1}^{(g)}(m)b_{n-1}^{(g)}(m) \quad \text{[Equation 23]}$$

As described, since the Walsh code uses a repeated pattern from a regular generation method, two Walsh codes different in length are always partially identical, and therefore a codeword sequence with a variety of lengths for bandwidth extendibility can be easily generated. A Walsh code correlator can be easily realized by the fast Hadamard transform algorithm. In addition, in the case that multiple UEs search for cells by using resources that are different in length in a given environment, the cell search of the UE that uses a minimum resource can be efficiently achieved when collision between such UE and the UE that uses a maximum resource is minimized. The collision can be minimized by generating a codeword sequence with the Walsh code.

The first exemplary embodiment of the present invention uses a single transmit antenna, but the following exemplary embodiments use multiple transmit antennas.

FIG. 10 is a schematic block diagram of a downlink signal generator in a cellular system according to a second exemplary embodiment of the present invention, and FIG. 11 to FIG. 13 respectively show a sub-frame structure of a downlink signal in the cellular system according to the second exemplary embodiment of the present invention. FIG. 11 to FIG. 13 show a sub-frame structure with two transmit antennas for convenience of description.

As shown in FIG. 10, a downlink signal generator 100' includes a pilot pattern generator 110', a time-frequency mapping unit 120', a plurality of OFDM transmitters 131', and a plurality of transmit antennas 132'.

The pilot pattern generator 110' receives cell number information and cell group information and generates a pilot pattern for each transmit antenna. The time-frequency mapping unit 120' receives a pilot pattern generated by the pilot pattern generator 110' and transmit antenna mapping information, frame structure information, and transmission traffic data from an external source, maps the data to the time domain, the frequency domain, and the antenna, and outputs the mapped data to the OFDM transmitter 131' of the corresponding transmit antenna 132'. Each OFDM transmitter 131' receives a downlink signal from the time-frequency mapping unit 120', and transmits the downlink signal through the corresponding transmit antenna 132'.

As shown in FIG. 11 to FIG. 13, pilot data are located with an interval of $N_{ps}$ for the transmit antenna 1 in at least one OFDM symbol of each sub-frame 210' of the downlink signal. A location of the pilot data of a transmit antenna x may be $$H_{N_p} = \begin{bmatrix} h_{\log_2 N_{max}}(1, (N_{max} - N_p - 1)/2 + 1) & \cdots & h_{\log_2 N_{max}}(1, (N_{max} + N_p - 1)) \\ \vdots & \ddots & \vdots \\ h_{\log_2 N_{max}}(2^{\lfloor \log_2 N_p \rfloor}, (N_{max} - N_p - 1)/2 + 1) & \cdots & h_{\log_2 N_{max}}(2^{\lfloor \log_2 N_p \rfloor}, (N_{max} + N_p - 1)) \end{bmatrix} \quad \text{[Equation 22]}$$

$$H_{\log_2 N_{max}} = [h_{\log_2 N_{max}}(i, j)]$$

As described, a conflict between different UEs having different resource sizes can be minimized by generating a gendifferent from that of the pilot data of the transmit antenna 1 in the frequency domain as shown in FIG. 11 or the time domain as shown in FIG. 12 (where x denotes a transmit antenna number, which is an integer greater than 2). The pilot data location of the transmit antenna x may be different from the pilot data location of the transmit antenna 1 in the time domain as well as the frequency domain.

A method for searching cells from a downlink signal transmitted from a plurality of transmit antennas will now be described with reference to FIG. 14.

FIG. 14 is a flowchart showing a cell search process according to the second exemplary embodiment of the present invention.

Although the UE is not aware of the number of transmit antennas, the base station uses at least one transmit antenna. Therefore, the cell search apparatus of the UE acquires sub-frame synchronization $\hat{l}_{sub}$ for a received pilot subcarrier signal of the transmit antenna 1 in a manner described with Equation 7 to Equation 11, in step S1210. As shown in FIG. 11 to FIG. 13, the location of the pilot subcarrier signal transmitted through the transmit antenna x is determined by a system parameter on the basis of the location of the pilot subcarrier signal transmitted through the transmit antenna 1. Therefore, the cell search apparatus may acquire sub-frame synchronization $\hat{l}_{sub}$ for the transmit antenna x based on the sub-frame synchronization $\hat{l}_{sub}$ and the system parameter, in step S1220.

As described through Equation 15, the cell search apparatus obtains a cross correlation between $y_{n_x}(l)$ determined by the pilot subcarrier signal of the transmit antenna x and J basic codes. Herein, a cross correlation of the transmit antenna x can be represented as Equation 24.

$$Z_{k,x}^{(j)} = \sum_{n_x=0}^{N_p-2} y_{n_x}(\hat{l}_{x,sub} + kL)e_{j,n}^*, \ j = 0,1, \ldots , \ [Equation\ 24]$$

$$J-1, k = 0,1, \ldots , N_{sub} - 1, x = 1,2, \ldots$$

Where $n_x$ denotes a parameter indicating a number of pilot subcarriers used by the transmit antenna x, and $\hat{l}_{x,sub}$ denotes a value determined by a system parameter based on $\hat{l}_{l,sub}$ and indicating a time location of an OFDM symbol of the transmit antenna x in the sub-frame.

As described through Equation 7 to Equation 10, $y_{n_x}(l)$ of the transmit antenna x corresponds to a product of $u_{n_x}(l)$ of the l-th received OFDM symbol and $u_{n_x}(l+L)$ of an OFDM symbol that is L OFDM symbols away. In addition, $u_{n_x}(l)$ is given by a product $r_{n_x}(l)r_{n_x+1}(l)^*$ of the $n_x$-th pilot subcarrier signal and the $(n_x+1)$-th pilot subcarrier signal of the l-th received OFDM symbol, and $u_{n_x}(l+L)$ is given by a product of the $n_x$-th pilot subcarrier signal and the $(n_x+1)$-th pilot subcarrier signal of the (l+L)-th received OFDM symbol. That is, $y_{n_x}(l)$ can be represented as Equation 25.

$$y_{n_x}(l) = u_{n_x}(l)u_{n_x}(l+L)^* \quad [Equation\ 25]$$

$$u_{n_x} = r_{n_x}(l)r_{n_x+1}(l)^*$$

$$u_{n_x}(l+L) = r_{n_x}(l+L)r_{n_x+1}(l+L)^*,$$

$$n_x = 0,1, \ldots , N_p - 2, x = 1,2, \ldots$$

The cell search apparatus estimates the number of transmit antennas by using the cross correlation $Z_{k,x}^{(j)}$, in step S1240. To estimate the number of transmit antennas, the cell search apparatus obtains a value for each transmit antenna in the $k_0$-th sub-frame through Equation 26. In this case, to improve performance of estimating the number of transmit antennas, $Z_{k_0,x}^{(j)}$ in Equation 26 may be replaced with a combination of $Z_{k_0,x}^{(j)}$'s from multiple sub-frames.

$$P_{k_0,x} = \sum_{j=0}^{J-1} |Z_{k_0,x}^{(j)}|, \ x = 1,2, \ldots \quad [Equation\ 26]$$

The cell search apparatus estimates the number of transmit antennas by searching x that makes $P_{k_0,x}$ in Equation 26 equal to or greater than a threshold value $Th_0$, in step S1230. In this case, the transmitting antenna 1 is certainly used, and therefore, the threshold value $Th_0$ can be represented as Equation 27 by $P_{k_0,1}$ for the transmit antenna 1.

$$Th_0 = a \cdot P_{k_0,1}, \ 0 < a < 1 \quad [Equation\ 27]$$

Where a is a proportion constant number.

Subsequently, the cell search apparatus acquires frame synchronization and searches for a cell group by using a cross correlation $Z_{k,x}^{(j)}$, $x \in U_{ant}$ of a transmit antenna included in a set $U_{ant}$ of transmit antenna numbers estimated through the above process, in step S1240.

To acquire frame synchronization and search for a cell group, the cell search apparatus combines $Z_{k,x}^{(j)}$ values for a transmit antenna included in $U_{ant}$ as given in Equation 28. In addition, the cell search apparatus decodes a codeword sequence by using $Z_k^{(j)}$ as in the first exemplary embodiment such that frame synchronization acquisition and cell group number search can be achieved.

$$Z_k^{(j)} = \sum_{x \in U_{ant}} Z_{k,x}^{(j)} \quad [Equation\ 28]$$

The cell search apparatus estimates a cell number by using the acquired frame synchronization and the searched cell group number, in step S1250. In more detail, similar to Equation 18, products of codes that respectively correspond to estimated cell group numbers for received pilot subcarrier signals of a transmit antenna belonging to a set $U_{ant}$ of transmit antenna numbers are calculated, and the respective products of the respective transmit antennas are added. After that, a cross correlation between cell-specific scrambling codes that correspond to cell numbers included in the estimated cell group is obtained. By searching for a cell number maximizing the cross correlation, a final cell number can be searched.

It has been described that a pilot is used for sub-frame synchronization acquisition, frame synchronization acquisition, and cell search according to the first and second exemplary embodiments. However, when an additional OFDM symbol is provided for symbol synchronization, frequency synchronization, and frame synchronization acquisition, only a cell group number and a cell number can be searched by using the methods of the first and second exemplary embodiments. In this case, cyclic shifted codewords of the basic codeword set are searched in a decoding process for searching for the cell group number. However, when the frame synchronization is already known, the decoding is performed only on the basic codeword set, thereby designing a codebook with better performance and reducing calculations for the decoding. In addition, cell search performance can be improved when symbol synchronization errors and frequency synchronization errors are reduced.

Constituent elements of the above-described exemplary embodiments of the present invention can be realized by at least one programmable logic device, such as a digital signal processor (DSP), a processor, a controller, and an application specific integrated circuit (ASIC), or hardware formed by a combination of the programmable logic devices. In addition, functions or processes described in the above exemplary embodiments can be partially realized by software, which can be recorded in a recording medium. Further, the constituent elements, functions, and processes in the above-described exemplary embodiments of the present invention can be realized by a combination of hardware and software.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

As described, according to the exemplary embodiments of the present invention, cells can be searched with a pilot pattern, without using a preamble of a downlink signal. In addition, the pilot pattern can be used for estimating sub-frame synchronization and/or frame synchronization. In addition, the pilot pattern can be used for estimating the number of transmit antennas used by the base station.

The invention claimed is:

1. A downlink signal generation apparatus in an orthogonal frequency division multiplexing (OFDM)-based cellular system, the downlink signal generation apparatus comprising:
a pilot pattern generator for generating pilot patterns respectively corresponding to a plurality of sub-frames that form one frame of a downlink signal, wherein the pilot pattern generator generates each pilot pattern by computing a product of a cell-specific scrambling code for identifying a cell and a cell group-specific code for identifying a cell-group in which the cell is included; and
a time-frequency mapping unit for generating the downlink signal by mapping the pilot pattern to the time-frequency domain,
wherein a plurality of cells included in the same cell group have the same cell group-specific code, and the cell-specific scrambling codes are different for the respective cells and the same for the respective sub-frames, and
the pilot pattern generator determines a second code according to a cell-group number, the second code corresponding to a product of a first code among the n-th code sequence of the m-th sub-frame and a first code among the n-th code sequence of the (m+1)-th sub-frame among the plurality of sub-frames, the first code among the n-th code sequence of the m-th sub-frame corresponds to a product of the n-th pilot symbol and the (n+1)-th pilot symbol of the m-th sub-frame, and the first code among the n-th code sequence of the (m+1)-th sub-frame corresponds to a product of the n-th pilot symbol and the (n+1)-th pilot symbol of the (m+1)-th sub-frame.

2. The downlink signal generation apparatus of claim 1, wherein the pilot pattern generator determines the second code by using a predetermined number of basic codes.

3. The downlink signal generation apparatus of claim 2, wherein the pilot pattern generator selects the second code from the predetermined number of basic codes by using a codeword sequence, wherein the codeword sequence is selected from a codebook and the codebook is designed to maximize a minimum symbol distance of the codebook for all cyclic shifts between the codeword sequences included in the codebook.

4. The downlink signal generation apparatus of claim 2, wherein the pilot pattern generator selects the second code from the predetermined basic codes by using a first codeword sequence, wherein the first codeword sequence is selected from a codebook formed by a comma-free Reed-Solomon (RS) code.

5. The downlink signal generation apparatus of claim 4, wherein when the length of a second codeword sequence of the RS code is less than the number of sub-frames, the pilot pattern generator forms the first codeword sequence by adding a predetermined number of adjacent elements located in an edge portion of the second codeword sequence to a predetermined location of the second codeword sequence.

6. The downlink signal generation apparatus of claim 2, wherein the basic code includes a Walsh code.

7. The downlink signal generation apparatus of claim 1, wherein the pilot pattern generator forms a first code that corresponds to a product of two adjacent cell group-specific codes in the frequency domain by using the Walsh code.

8. The downlink signal generation apparatus of claim 6, wherein the pilot pattern generator is a generator matrix generator for generating a Walsh code having a second length that is shorter than a first length by extracting a partial row and a partial column from a generator matrix that forms a Walsh code having the first length.

9. The downlink signal generation apparatus of claim 1, wherein the pilot pattern generator determines the cell group-specific code by a differential form of the first code.

10. The downlink signal generation apparatus of claim 1, further comprising a plurality of transmit antennas respectively transmitting the downlink signal,
wherein the time-frequency mapping unit sets a pilot pattern location of a first transmit antenna among the plurality of transmit antennas and a pilot pattern location of a second transmit antenna among the plurality of transmit antennas to be different from each other in at least one of the frequency domain and the time domain.

11. A cell search apparatus of user equipment (UE) using at least one transmit antenna in an orthogonal frequency division multiplexing (OFDM)-based cellular system, the cell search apparatus comprising:
a receiver for receiving a signal of which a frame is formed of a plurality of sub-frames, each having a plurality of OFDM symbols, at least one OFDM symbol of each sub-frame having at least one pilot pattern that corresponds to the at least one transmit antenna, the pilot pattern corresponding to a product of a cell group-specific code and a cell-specific scrambling code, the cell group-specific code formed of codes selected from predetermined number of basic codes;
a first estimator for estimating at least one sub-frame starting position for each of the least one transmit antenna;
a second estimator for estimating a frame starting position and a cell-group number of a cell group that includes a cell in which the UE is located by using the least one sub-frame starting location for the at least one transmit antenna; and
a third estimator for estimating a cell number of a cell in which the UE is currently located by using a plurality of pilot subcarrier signals, the at least one sub-frame starting position, the frame starting position, the cell-group number, and the cell-specific scrambling code, the plurality of pilot subcarrier signals located in the frequency domain where the pilot pattern is formed among a plurality of subcarrier signals of each OFDM symbol of each sub-frame, wherein the second estimator estimates the cell-group number and the frame starting position from a plurality of pilot subcarrier signals of an OFDM symbol located in at least one of starting positions of the respective sub-frames of at least one frame and the predetermined number of basic codes, and the at least one of the starting positions corresponds to a sub-frame starting position of at least one of the available antenna used by the UE among the at least one of the transmit antenna, and wherein the second estimator calculates cross correlations between a plurality of first signals of an OFDM symbol located in at least one of a sub-frame starting position for the least one transmit antenna and the respective basic codes;

determines an antenna estimation value from the cross correlations of the least one sub-frame for each of the at least one transmit antenna; and determines a transmit antenna having an antenna estimation value that is greater than a threshold value among the at least one transmit antenna as the available antenna, wherein the respective first signals correspond to a product of a second signal that is a product of two adjacent pilot subcarrier signals in an OFDM symbol located in the corresponding sub-frame starting position and a second signal in an OFDM symbol located in a starting position of a sub-frame that is adjacent to the corresponding sub-frame.

12. The cell search apparatus of claim 11, wherein the first estimator estimates a sub-frame starting position for a first transmit antenna from a plurality of first pilot subcarrier signals of each OFDM symbol of the at least one sub-frame and the predetermined number of basic codes, and the plurality of first pilot subcarrier signals correspond to a pilot pattern of the first transmit antenna among the at least one transmit antenna.

13. The cell search apparatus of claim 12, wherein the first estimator calculates cross correlations between a plurality of first signals of the respective OFDM symbols and the basic codes and estimates the sub-frame starting position from the cross correlations of the respective OFDM symbols, wherein each of the plurality of first signals corresponds to a product of a second signal, which is a product of two adjacent first pilot subcarrier signals in an OFDM signal that correspond to the first signal, and a second signal in an OFDM symbol that is away by a pilot interval from the OFDM symbol in the time domain.

14. The cell search apparatus of claim 13, wherein the first estimator combines the cross correlations respectively corresponding to the respective basic codes at the same OFDM symbol location of the at least one sub-frame, and estimates a value that maximizes a sum of absolute values of the combined cross correlations as the sub-frame starting position.

15. The cell search apparatus of claim 13, wherein the first estimator combines the cross correlations respectively corresponding to the respective basic codes at the same OFDM symbol location of the at least one sub-frame and estimates a symbol time having the maximum number of the basic code that corresponds to the maximum absolute value among the absolute values of the combined cross correlations as the sub-frame starting position.

16. The cell search apparatus of claim 11, wherein a pilot pattern of at least one of a second transmit antenna set among the at least one transmit antenna is formed in a different location in at least one of a time domain and a frequency domain from a location where the pilot pattern of the first transmit antenna is formed, and the first estimator estimates a sub-frame starting position of the at least one of the second transmit antenna from the sub-frame starting position of the first transmit antenna.

17. The cell search apparatus of claim 11, wherein the threshold value is determined by an antenna estimation value of a first transmit antenna among the at least one transmit antenna.

18. The cell search apparatus of claim 11, wherein the antenna estimation value corresponds to a sum of absolute values of combined cross correlations, each of the cross correlations corresponding to the respective basic codes in the at least one sub-frame.

19. The cell search apparatus of claim 11, wherein the second estimator:

calculates cross correlations between a plurality of first signals of an OFDM symbol located at a starting position of each sub-frame of at least one frame for the least one available antenna and the respective basic codes;

estimates the cell-group number and frame synchronization by decoding a codeword sequence used for selecting a basic code for at least one cell group with the cross correlations of the respective sub-frames for each of the at least one available antenna; and the respective first signals correspond to a product of a second signal that is a product of two adjacent first pilot subcarrier signals in an OFDM symbol located in the corresponding sub-frame starting position and a second signal in an OFDM symbol located in a starting position of a sub-frame that is adjacent to the corresponding sub-frame.

20. The cell search apparatus of claim 19, wherein the second estimator decodes the codeword sequence by using the respective cross correlations for the at least one available antenna of each sub-frame.

21. The cell search apparatus of claim 19, wherein the second estimator decodes the codeword sequence by using a combination value of cross correlations for the respective sub-frames of a plurality of frames.

22. The cell search apparatus of claim 19, wherein the cross correlation is a normalized cross correlation.

23. The cell search apparatus of claim 19, wherein the second estimator uses a comma-free Reed-Solomon (RS) decoding method.

24. The cell search apparatus of claim 23, wherein the second estimator uses a basic codeword sequence that has not experienced a cyclic shift operation as the codeword sequence.

25. The cell search apparatus of claim 23, wherein when the UE is aware of cell group information on a cell in which the UE is currently located and neighboring cells, the at least one cell group corresponds to a cell group in which the current cell and the neighboring cells are included.

26. The cell search apparatus of claim 11, wherein the third estimator estimates the cell number from the plurality of pilot subcarrier signals of an OFDM symbol located in at least one starting position of at least one sub-frame and the scrambling code of at least one cell belonging to the cell group number.

27. The cell search apparatus of claim 26, wherein when the UE is aware of the information on the current cell and the neighboring cells, the at least one cell corresponds to the current cell and the neighboring cells.

28. The cell search apparatus of claim 26, wherein the third estimator estimates a number that maximizes a cross correlation between a plurality of first signals and a plurality of second signals of each OFDM symbol located at the at least one sub-frame starting position of at least one sub-frame as the cell number, among cell numbers corresponding to the at least one cell, and the respective first signals correspond to a sum of first values that correspond to a product of two adjacent subcarrier signals in OFDM symbols respectively located in at least one starting position of at least on sub-frame and the respective second signals correspond to a product of two scrambling codes, respectively corresponding to the two adjacent first subcarrier signals.

29. The cell search apparatus of claim 28, wherein the first value corresponds to a product of a product of the two adjacent first subcarrier signals and a product of two cell group-specific codes, respectively corresponding to the two adjacent subcarrier signals.

30. The cell search apparatus of claim 28, wherein when the at least one sub-frame includes a plurality of sub-frames, the first value corresponds to a sum of first values at OFDM symbols, respectively located at the respective sub-frame starting positions.

31. The cell search apparatus of claim 28, wherein the cross correlation is a normalized cross correlation.

\* \* \* \* \*